(12) United States Patent
Simon et al.

(10) Patent No.: US 7,887,740 B2
(45) Date of Patent: Feb. 15, 2011

(54) COMPOSITE POWDER, USE IN A SHAPING PROCESS, AND MOULDINGS PRODUCED FROM THIS POWDER

(75) Inventors: Ulrich Simon, Herne (DE); Sylvia Monsheimer, Haltern am See (DE); Maik Grebe, Bochum (DE); Stefan Altkemper, Dorsten (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/105,672

(22) Filed: Apr. 18, 2008

(65) Prior Publication Data

US 2008/0258346 A1   Oct. 23, 2008

(51) Int. Cl.
B29C 35/02 (2006.01)
B29C 35/08 (2006.01)

(52) U.S. Cl. .............. 264/497; 264/401; 264/409; 264/413; 264/486; 264/489; 264/491

(58) Field of Classification Search ............ 264/401, 264/409, 486, 489, 491, 497, 413
See application file for complete search history.

(56) References Cited

U.S. PATENT DOCUMENTS

| | | | |
|---|---|---|---|
| 5,425,817 A | 6/1995 | Mugge et al. | |
| 6,589,471 B1 * | 7/2003 | Khoshnevis | 264/497 |
| 6,884,485 B2 | 4/2005 | Baumann et al. | |
| 7,135,525 B2 | 11/2006 | Petter et al. | |
| 7,148,286 B2 | 12/2006 | Baumann et al. | |
| 7,211,615 B2 | 5/2007 | Baumann et al. | |
| 7,317,044 B2 | 1/2008 | Monsheimer et al. | |
| 2004/0102539 A1 * | 5/2004 | Monsheimer et al. | 522/2 |
| 2004/0106691 A1 | 6/2004 | Monsheimer et al. | |
| 2004/0137228 A1 | 7/2004 | Monsheimer et al. | |
| 2004/0232583 A1 | 11/2004 | Monsheimer et al. | |
| 2005/0014842 A1 | 1/2005 | Baumann et al. | |
| 2005/0027050 A1 | 2/2005 | Monsheimer et al. | |
| 2006/0071359 A1 | 4/2006 | Monsheimer et al. | |
| 2006/0134419 A1 | 6/2006 | Monsheimer et al. | |
| 2006/0182916 A1 | 8/2006 | Dowe et al. | |
| 2006/0183869 A1 | 8/2006 | Dowe et al. | |
| 2006/0189784 A1 | 8/2006 | Monsheimer et al. | |
| 2006/0202395 A1 | 9/2006 | Monsheimer et al. | |
| 2006/0223928 A1 | 10/2006 | Monsheimer et al. | |
| 2006/0244169 A1 | 11/2006 | Monsheimer et al. | |
| 2006/0281873 A1 | 12/2006 | Alting et al. | |
| 2007/0013108 A1 | 1/2007 | Monsheimer et al. | |
| 2007/0055044 A1 | 3/2007 | Simon et al. | |
| 2007/0104971 A1 | 5/2007 | Wursche et al. | |
| 2007/0126159 A1 | 6/2007 | Simon et al. | |
| 2007/0166560 A1 | 7/2007 | Wursche et al. | |
| 2007/0182070 A1 | 8/2007 | Monsheimer et al. | |
| 2007/0183918 A1 | 8/2007 | Monsheimer et al. | |
| 2007/0197692 A1 | 8/2007 | Monsheimer et al. | |
| 2007/0232753 A1 | 10/2007 | Monsheimer et al. | |
| 2007/0238056 A1 | 10/2007 | Baumann et al. | |
| 2007/0260014 A1 | 11/2007 | Simon et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0217821 A1 | 9/2008 | Goring et al. | |
| 2008/0242782 A1 | 10/2008 | Hager et al. | |
| 2008/0249237 A1 | 10/2008 | Hager et al. | |
| 2009/0088508 A1 | 4/2009 | Monsheimer et al. | |

FOREIGN PATENT DOCUMENTS

| | | |
|---|---|---|
| WO | WO 96/06881 | 3/1996 |
| WO | WO 96/30195 | 10/1996 |
| WO | WO 2005/082979 A1 | 9/2005 |

OTHER PUBLICATIONS

U.S. Appl. No. 11/587,795, filed Oct. 27, 2006, Monsheimer, et al.
U.S. Appl. No. 11/596,365, filed Nov. 14, 2006, Monsheimer, et al.
U.S. Appl. No. 60/831,222, filed Jul. 17, 2006, Hager, et al.
U.S. Appl. No. 12/407,065, filed Mar. 19, 2009, Monsheimer, et al.
U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.

* cited by examiner

*Primary Examiner*—Khanh Nguyen
*Assistant Examiner*—Carson Gross
(74) *Attorney, Agent, or Firm*—Oblon, Spivak, McClelland, Maier & Neustadt, L.L.P.

(57) ABSTRACT

The present invention relates to a composite powder of polymer powder and porous glass beads, and to the use of this composite powder for shaping processes, and also to mouldings produced from this composite powder.

6 Claims, No Drawings

COMPOSITE POWDER, USE IN A SHAPING PROCESS, AND MOULDINGS PRODUCED FROM THIS POWDER

CROSS-REFERENCE TO RELATED APPLICATIONS

The present application claims the benefit of DE 102007019133.4 filed on Apr. 20, 2007, the contents of which are incorporated by reference.

FIELD OF THE INVENTION

The invention relates to molded products and compositions useful for their manufacture.

DESCRIPTION OF RELATED ART

Rapid provision of prototypes is a task frequently encountered in recent times. Particularly suitable processes are those based on pulverulent materials, where the desired structures are produced layer-by-layer via selective melting and hardening. No support structures are needed here for overhangs and undercuts, since the powder bed surrounding the molten regions provides sufficient support. There is also no subsequent work needed to remove supports. The processes are also suitable for short-run production.

A process which has particularly good suitability for the purpose of rapid prototyping is selective laser sintering. In this process, plastics powders are selectively and briefly irradiated with a laser beam in a chamber, the result being that the powder particles impacted by the laser beam melt. The molten particles coalesce and rapidly solidify again to give a solid mass. Repeated irradiation of layers constantly freshly applied can produce three-dimensional bodies simply and rapidly by this process.

The laser-sintering (rapid prototyping) process for production of mouldings from pulverulent polymers is described in detail in the patent specifications U.S. Pat. No. 6,136,948, WO 96/06881 (both DTM Corporation). A wide variety of polymers and copolymers is claimed for this application, examples being polyacetate, polypropylene, polyethylene, ionomers and polyamide.

Other processes with good suitability are the SIB process as described in WO 01/38061 and a process as described in EP 1 015 214. Both processes use full-surface infra-red heating for melting of the powder. The selectivity of melting is achieved in the first process via application of an inhibitor, and in the second process via a mask. A further process is described in DE 103 11 438. In this process, the energy needed for fusion is introduced via a microwave generator, and the selectivity is achieved via application of a susceptor.

Other suitable processes are those using an absorber, either present in the powder or applied by ink-jet processes, as described in DE 10 2004 012 682.8, DE 10 2004 012 683.6 and DE 10 2004 020 452.7.

Pulverulent substrates can be used for the rapid prototyping or rapid manufacturing processes (RP or RM processes) mentioned, in particular polymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture thereof.

WO 95/11006 describes a polymer powder suitable for laser sintering, which when melting behaviour is determined via differential scanning calorimetry at a scanning rate of from 10 to 20° C./min exhibits no overlap of the melting peak and recrystallization peak, and which has a degree of crystallinity of from 10 to 90%, likewise determined via DSC, and a number-average molecular weight Mn of from 30 000 to 500 000, and whose Mw/Mn quotient is in the range from 1 to 5.

DE 197 47 309 describes the use of a nylon-12 powder with increased melting point and increased enthalpy of fusion, obtained via reprecipitation of a polyamide previously prepared via ring-opening and subsequent polycondensation of laurinlactam. This is a nylon-12.

DE 102004003485 describes the use of particles with at least one cavity in layer-construction processes. All of the particles here comprise at least one cavity, and the particles comprising the cavity are melted via input of electromagnetic energy.

Powders described above are sometimes provided with glass beads for reinforcement. Since considerable proportions of reinforcing material have to be used here to achieve any effect, the density of the component increases markedly, as also does that of the powder mixture. Furthermore, handling of these powder mixtures often leads to demixing phenomena, the result being that the mechanical properties that the reinforcing material is intended to achieve are not always constant. The regions in which the proportion of glass beads is excessive become very brittle and thus unusable, and the regions in which too few glass beads are present are softer than intended. The demixing arises from the different density of the polymer particles and of the glass beads, and tends to become evident to some extent whenever the powder mixture is transported or handled. In particular, if powder handling is automated in the rapid manufacturing process the result can be difficulty in controlling deviations of properties in the components produced.

SUMMARY OF THE INVENTION

One embodiment of the invention is composite powder comprising at least one polymer powder and porous glass beads. The polymer powder can be at least one of nylon-11 powder and nylon-12 powder.

Also embodied herein is where the average particle diameter of the at least one polymer powder is from 30 to 120 µm, from 40 to 100 µm, and/or from 45 to 70 µm.

Also embodied herein is where the ratio of the average particle diameter of the at least one polymer powder to the porous glass beads is from 1.5:1 to 10:1, from 1.7:1 to 5:1 and/or from 2:1 to 3:1.

Also embodied herein is where the ratio by weight of the porous glass beads to the, at least one polymer powder is from 1:10 to 20:10, from 2:10 to 15:10, and/or from 5:10 to 12:10.

The invention also provides a process for the production of mouldings whereby at least one layer of at least one composite powder as described in the preceding paragraphs and further described herein is provided and then at least one region of the at least one layer is melted with electromagnetic energy, and wherein at least one other region is not melted. The inhibition of melting can be accomplished by providing one or more of a susceptor of the electromagnetic energy, an inhibitor of the electromagnetic energy, an absorber of the electromagnetic energy, and/or a mask for the electromagnetic energy.

Mouldings produced by this process are also embodied herein.

DETAILED DESCRIPTION OF THE INVENTION

It was therefore an object of the present invention to provide a composite powder which permits production of minimum-weight mouldings which at the same time have a relatively high modulus of elasticity, by processing methods that have maximum reproducibility. The other mechanical properties obtained are not to be poorer than those of a comparable polymer powder with glass beads according to the prior art. The processing method here is a layer-by-layer process in which regions of the respective powder layer are selectively melted by means of electromagnetic energy and, after cooling, have bonded to give the desired moulding.

Surprisingly, it has now been found, as described in the claims, that the use of porous glass beads as reinforcing material alongside a pulverulent polymer can produce composite powders from which mouldings can be produced via a layer-by-layer process in which regions of the respective powder layer are selectively melted, where these have advantages in respect of density and tendency towards warpage, together with better properties in respect of consistent processing then using a reinforced polymer powder of the prior art, for example the commercially available materials Duraform GF or EOSINT 3200 GF.

The invention relates to a composite powder based on a pulverulent polymer with glass beads, the powder having advantages with respect to stability of the production process and with respect to density, and to the use of this composite powder in shaping processes, and also to mouldings produced via a layer-by-layer process which selectively melts regions of a powder layer, using this powder. After cooling and hardening of the regions previously melted layer-by-layer, the moulding can be removed from the powder bed. The inventive mouldings moreover have less tendency towards warpage than conventional mouldings.

The selectivity of the layer-by-layer processes here can by way of example be achieved by way of application of susceptors, of absorbers, or of inhibitors, or via masks, or by way of focused energy introduction, for example a laser beam, or by way of glass fibres. The energy input is achieved by way of electromagnetic radiation.

The composite powder is only partially melted in the inventive process. The inventive reinforcing material is encapsulated by the polymer powder which is melted via electromagnetic energy input, and after cooling of the polymer component a moulding is formed which comprises polymer and, embedded therein, reinforcing material.

It is preferable here that the particles of the reinforcing material are, like the particles of the polymer component, approximately round.

The average particle diameter of the polymer component is from 30 to 120 µm, preferably from 40 to 100 µm and particularly preferably from 45 to 70 µm. In a particularly preferred embodiment of the composite powder, it has been found that the particle diameter of the reinforcing material should be smaller than that of the polymer component. Preference is given to a ratio of average diameter of the polymer particles to the average particle diameter of the reinforcing-material particles of from 1.5:1 to 10:1, particularly from 1.7:1 to 5:1, and in particular from 2:1 to 3:1.

The proportion here by weight of reinforcing material, based on polymer content, is from 1:10 to 20:10, preferably from 2:10 to 15:10, and particularly preferably from 5:10 to 12:10.

The density of the composite component here according to the invention is lower than for a component produced from composite powder according to the prior art. An advantage of this is that parts can be produced with lightweight construction, where the reinforcing action does not simultaneously generate disadvantages in relation to increased weight.

Another subject matter of the present invention is mouldings produced via a layer-by-layer process which selectively melts regions of the respective layer, characterized in that they comprise at least one polymer and also one reinforcing material, and in that the density of the inventive composite component here has been lowered with respect to a component produced from composite powder of the prior art. The tendency towards warpage of the inventive composite components has likewise been reduced.

An advantage of the inventive composite powder is when it is used in a layer-by-layer process in which regions of the respective layer are selectively melted the mouldings produced have lower density and less tendency towards warpage than mouldings made from conventional composite powders. When compared with conventional composite powders, the inventive powder here reduces process risk; there is markedly less danger of demixing.

The mechanical properties of the mouldings produced from the inventive composite powder here are good and similar to those of the mouldings produced from conventional composite powder.

The inventive composite powder is described below, with no intention to restrict the invention thereto.

A feature of the inventive composite powder for processing in a layer-by-layer process in which regions of the respective layer are selectively melted is that the powder comprises at least porous glass beads and a pulverulent polymer, preferably a polyamide, particularly preferably a nylon-11 or -12.

The polymer component can comprise amorphous or semicrystalline polymers or a mixture thereof. Examples that may be mentioned without restricting the invention thereto are polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide or a mixture thereof. The polymer component is converted to the powder form via processes of the prior art, for example via milling, spray drying, precipitation or other suitable processes. Sieving or classification can then be advantageous. Post-treatment in a mixer with high shear, preferably at temperatures above the glass transition point of the respective polymer, can also follow, in order to round-off the particles and thus improve powder-flow capability.

One preferred embodiment uses PA11 or PA12 or a mixture thereof as polymer component of the inventive composite powder.

It is particularly preferable that the polymer component comprises particles obtained by way of example via a process according to DE 29 06 647 B1 or via DE 197 08 146. The polyamide is dissolved in ethanol and crystallized out under particular conditions. If appropriate, the material is subjected to precautionary sieving and further classification or low-temperature milling.

The bulk density of the polymer powder alone is typically from 220 to 600 g/l.

Surprisingly, it has been found that the disadvantages, in particular the demixing of the components, of a composite powder of the prior art during the construction process, and also during the up-and downstream powder-transport processes, can be eliminated if the reinforcing component has porous glass beads. The construction process can therefore proceed with markedly less risk and more reproducibility, and it is possible to produce mouldings with constant quality and lower density and less tendency towards warpage.

It is preferable here that the particles of the reinforcing material are, like the particles of the polymer component, approximately round.

The average particle diameter of the polymer component is from 30 to 120 μm, preferably from 40 to 100 μm and particularly preferably from 45 to 70 μm. In a particularly preferred embodiment of the composite powder, it has been found that the particle diameter of the reinforcing material should be smaller than that of the polymer component. Preference is given to a ratio of average diameter of the polymer particles to the average particle diameter of the reinforcing-material particles of from 1.5:1 to 10:1, particularly from 1.7:1 to 5:1, and in particular from 2:1 to 3:1.

The proportion here by weight of reinforcing material, based on polymer content, is from 1:10 to 20:10, preferably from 2:10 to 15:10, and particularly preferably from 5:10 to 12:10.

The reinforcing material comprises porous glass beads. They are also known as expanded glass. The production process adds a blowing agent to produce granules or particles at high temperature. This process produces mainly round particles with irregular surface, with very fine pore structures in the interior. The result is, based on density, improved mechanical properties in comparison with solid glass beads or hollow glass beads. For the inventive use it can be advantageous to fractionate the expanded glass beads. The bulk density of this component alone is usually from 250 to 600 g/l. Surprisingly, it has now been found that these advantages of the expanded glass can also be retained in an inventive composite powder and in an inventive process, and also in mouldings. Furthermore, the good thermal insulation of the reinforcing material leads to a reduced tendency towards curl in the construction process.

The low density of the glass beads has an advantageous effect. Mouldings for lightweight construction can now be produced as described above with mouldless processes. This opens up new application sectors. Another advantage of the porous glass beads is the irregular surface. This can give mechanical interlocking between the surface and the polymer component, which is advantageous for mechanical properties. Glass beads used in composite powders of the prior art usually have a relatively smooth surface and no fine pores, and also have markedly higher bulk density.

In one embodiment, the reinforcing component of the composite powder comprises an expanded glass provided with a size.

The porous glass beads are obtainable, for example, from Dennert Poraver GmbH in Schlüsselfeld, Germany.

The polymer component and the reinforcing component and any further auxiliaries are preferably mixed in a dry-blend mixture of the prior art.

Inventive composite powder can moreover comprise auxiliaries and/or further organic or inorganic pigments. Examples of these auxiliaries can be powder-flow aids, e.g. precipitated and/or fumed silicas. Precipitated silicas are marketed, for example, as Aerosil with various specifications by Degussa AG. It is preferable that inventive composite powder comprises less than 3% by weight, preferably from 0.001 to 2% by weight, and very particularly from 0.05 to 1% by weight, of these auxiliaries, based on the entirety of the polymers present. The pigments can, for example, be titanium dioxide particles based on rutile (preferably) or anatase, or can be carbon black particles.

It is also possible to mix conventional polymer powders with inventive composite powders. The process for preparation of these mixtures can be found, for example, in DE 34 41 708.

To improve processability, or for further modification of the composite powder, these can receive additions of inorganic foreign pigments, e.g. transition metal oxides, stabilizers, e.g. phenols, in particular sterically hindered phenols, flow agents and powder-flow aids, e.g. fumed silicas. It is preferable that the amount of these substances added to the polymers, based on the total weight of polymers in the polymer powder, is such as to give compliance with the stated concentrations for auxiliaries for the inventive polymer powder.

The present invention also provides processes for the production of mouldings via layer-by-layer processes in which regions of the respective layer are selectively melted, in which inventive composite powders are used, which are characterized in that these comprise at least one polymer powder and porous glass beads.

The energy is introduced via electromagnetic radiation, and the selectivity is introduced, for example, via masks, application of inhibitors, of absorbers, or of susceptors, or else focusing of the radiation, for example via lasers. The electromagnetic radiation encompasses the range from 100 nm to 10 cm, preferably from 400 nm to 10 600 nm, or from 800 to 1060 nm. The source of the radiation can, for example, be a microwave generator, a suitable laser, a radiant heat source, or a lamp, or else a combination thereof. After the cooling of all of the layers, the inventive moulding can be removed.

The examples below of these processes serve for illustration, with no intention that the invention be restricted thereto.

Laser sintering processes are well known and are based on the selective sintering of polymer particles, where layers of polymer particles are briefly exposed to laser light, and the polymer particles exposed to the laser light are thus bonded to one another. Three-dimensional objects are produced via successive sintering of layers of polymer particles. Details of the selective laser sintering process are found, for example, in the specifications U.S. Pat. No. 6,136,948 and WO 96/06881.

Other processes with good suitability are the SIB process as described in WO 01/38061 and a process as described in EP 1 015 214. Both processes use full-surface infra-red heating for melting of the powder. The selectivity of melting is achieved in the first process via application of an inhibitor, and in the second process via a mask. A further process is described in DE 103 11 438. In this process, the energy needed for fusion is introduced via a microwave generator, and the selectivity is achieved via application of a susceptor.

Other suitable processes are those using an absorber, either present in the powder or applied by ink-jet processes, as described in DE 10 2004 012 682.8, DE 10 2004 012 683.6 and DE 10 2004 020 452.7.

A feature of the inventive mouldings, which are produced via a layer-by-layer process in which regions are selectively melted is that they comprise at least one polymer, and also a reinforcing material, and that the density of the inventive composite components here is reduced in comparison with that of a component produced from composite powder of the prior art, and tendency towards warpage is reduced.

The mouldings can moreover comprise auxiliaries (and the statements made for the polymer powders apply here), examples being heat stabilizers, e.g. sterically hindered phenol derivatives. Inventive mouldings preferably comprise less than 3% by weight, particularly preferably from 0.001 to 2% by weight, and very particularly preferably from 0.05 to 1% by weight, of these auxiliaries, based on the entirety of the polymers present.

Application sectors for these mouldings can be found not only in rapid prototyping but also in rapid manufacturing. The latter certainly means small production runs, i.e. production of more than one identical part, but where production by means of an injection mould is not cost-effective. Examples here are parts for high-specification cars where the number of units produced is only small, or replacement parts for motor sports, where the important factors are not only the small number of units but also the lead time.

Industries using the inventive parts can be the aerospace industry, medical technology, mechanical engineering, automobile construction, the sports industry, the household goods industry, the electrical industry and the lifestyle sector.

The examples below are intended to describe the inventive composite powder and its use, without restricting the invention to the examples.

The laser scattering values measured were obtained with a Malvern Mastersizer S, Version 2.18. Bulk density was determined by an apparatus to DIN 53466.

The examples below are intended to illustrate the invention but not to restrict it.

COMPARATIVE EXAMPLE

Non-Inventive Composite Powder 100 parts of EOSINT PA2200 from EOS GmbH are mixed in an MTI mixer (500 rpm, 5 minutes) with 40 parts of Spheriglass E-2000 glass beads from Potters Ballotini. These are compact glass beads whose BET surface area is below 1 $m^2/g$ and whose particle size is smaller than 100 µm, density 2.5 $g/cm^3$.

INVENTIVE EXAMPLE 1

Composite Powder with Expanded Glass Beads from 40 to 125 µm 100 parts of EOSINT PA2200 from EOS GmbH are mixed in an MTI mixer (500 rpm, 5 minutes) with 30 parts of Poraver expanded glass beads from Denner Poraver GmbH. These are porous glass beads whose bulk density is 530 $kg/m^3$ and whose particle size is smaller than from 40 to 125 µm, density about 1.0 $g/cm^3$.

Processing of Composite Powders:

All of the powders were used for a construction process in an EOSINT P360 from EOS GmbH, Krailling, Germany.

This is a laser-sintering machine. The construction chamber was preheated up to almost the melting point of the respective specimen. The parameters for the laser, such as velocity and power, were adapted to each material via trials.

As can be seen from Table 1 below, the inventive test specimens exhibit marked advantages in particular in relation to density while other mechanical properties are in essence unaltered. The different degrees of reinforcement here have to be considered. Based on component density, mechanical properties have been improved.

The inventive components moreover exhibit markedly less warpage. Nor did any demixing effects occur during the construction process.

TABLE 1

|  | Comparative example | Inventive Example 1 |
| --- | --- | --- |
| Modulus of elasticity | 2959 | 2545 |
| Density [g/l] | 1.26 | 1.01 |
| E-modulus, based on density | 2348 | 2519 |
| Standard deviation in % E-modulus | (13 specimens) 7.5% | (5 specimens) 2.7% |

The invention claimed is:

1. A process for the production of mouldings via a layer-by-layer process, said process comprising selectively melting regions of a powder layer comprising at least one composite powder via introduction of electromagnetic energy; wherein the selectivity is achieved via application of inhibitors, of absorbers, or via masks; wherein the at least one composite powder comprises at least one polymer powder and porous glass beads; and wherein at least one other region is not melted.

2. The process of claim 1, wherein the at least one polymer powder is a polyamide powder.

3. The process of claim 1, wherein the at least one polymer powder is at least one of a nylon-11 powder and nylon-12 powder.

4. The process of claim 1, wherein the average particle diameter of the at least one polymer powder in the composite powder is from 30 to 120 µm.

5. The process of claim 1, wherein the ratio of the average particle diameter of the at least one polymer powder to the porous glass beads in the composite powder is from 1.5:1 to 10:1.

6. The process of claim 1, wherein the ratio by weight of the porous glass beads to the at least one polymer powder in the composite powder is from 1:10 to 20:10.

* * * * *